F. A. M. CHAPON.
CASH REGISTER OR CHECK TILL.
APPLICATION FILED APR. 22, 1909.

1,013,741.

Patented Jan. 2, 1912.
4 SHEETS—SHEET 1.

WITNESSES

INVENTOR
Francis A. M. Chapon
BY Munn & Co
ATTORNEYS

F. A. M. CHAPON.
CASH REGISTER OR CHECK TILL.
APPLICATION FILED APR. 22, 1909.
1,013,741.
Patented Jan. 2, 1912.
4 SHEETS—SHEET 2.
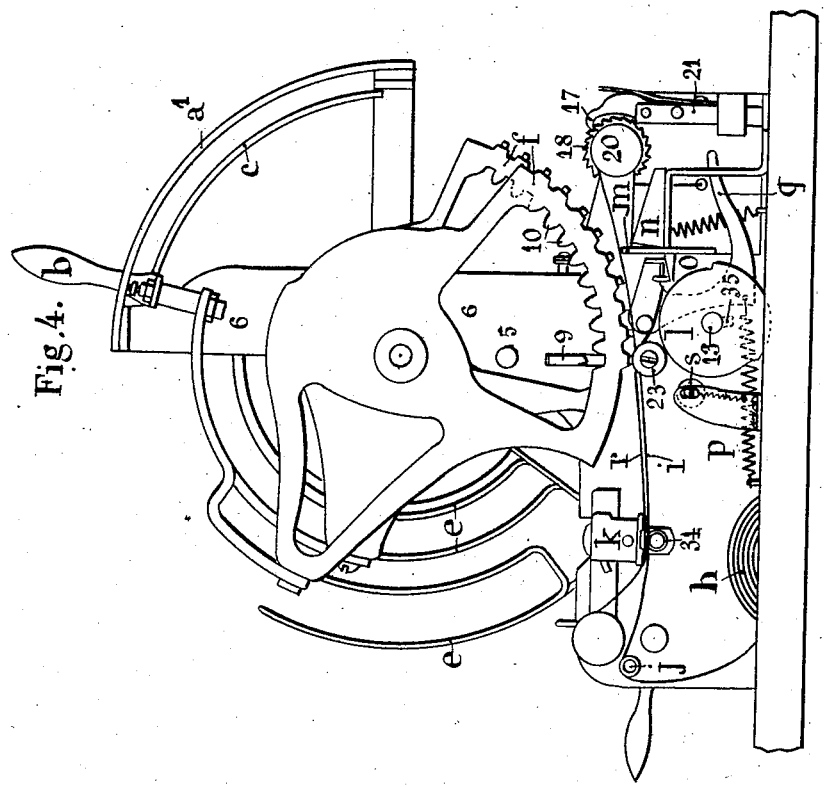
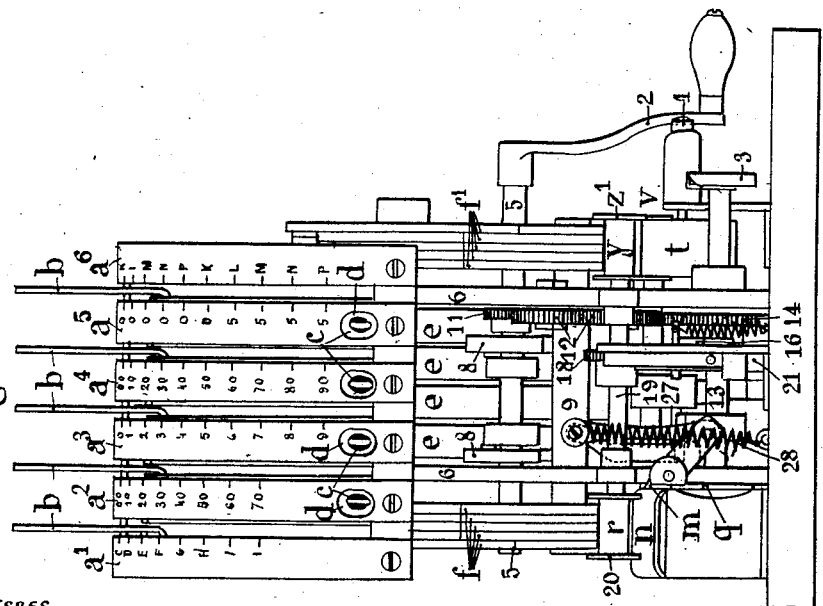
WITNESSES
J. P. Davis
INVENTOR
Francis A. M. Chapon,
BY
ATTORNEYS

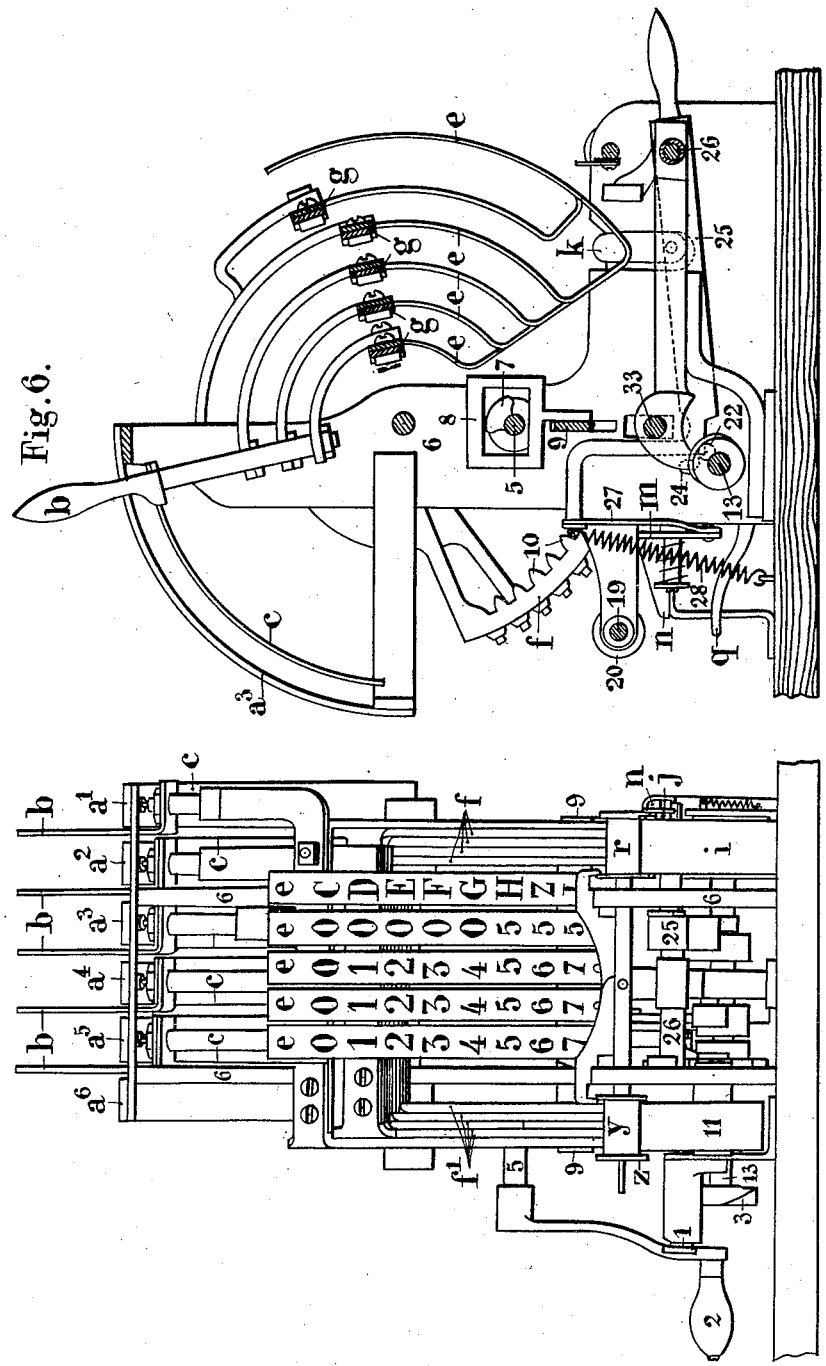

F. A. M. CHAPON.
CASH REGISTER OR CHECK TILL.
APPLICATION FILED APR. 22, 1909.
1,013,741.
Patented Jan. 2, 1912.
4 SHEETS—SHEET 4.
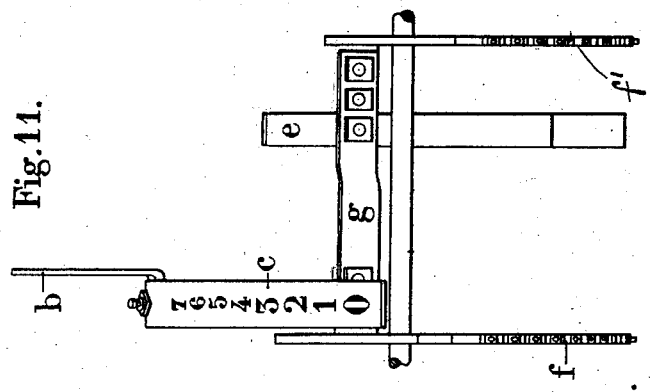
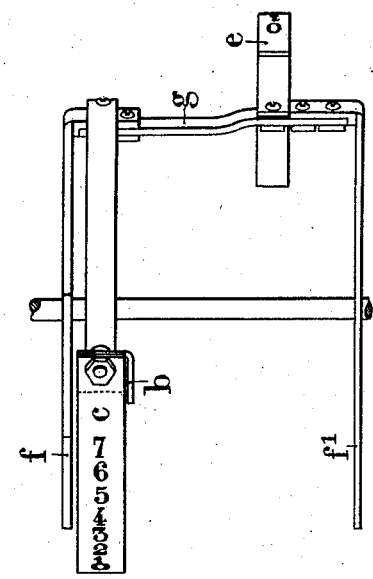
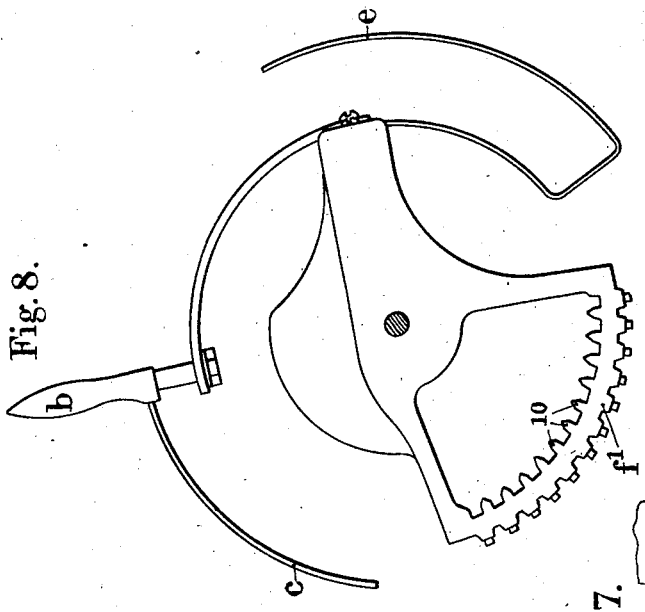
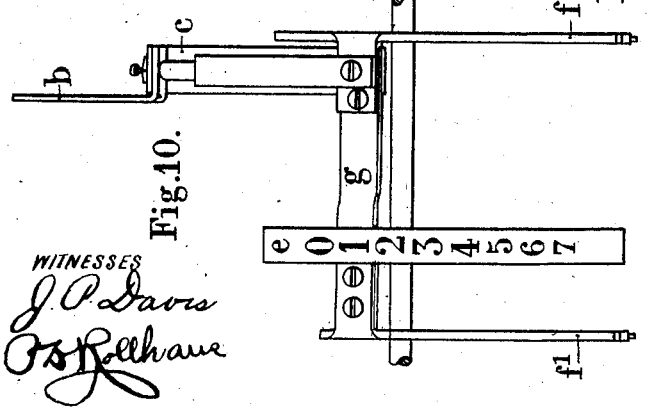
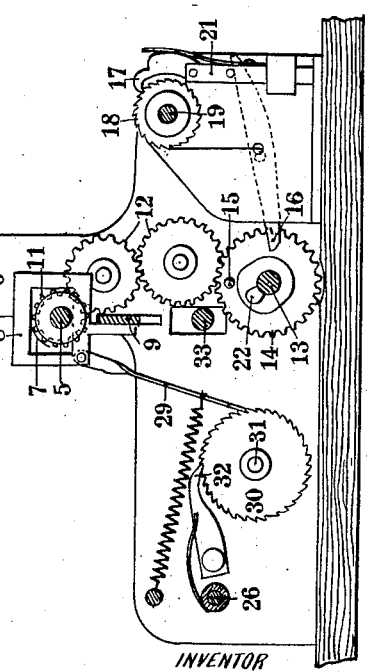
INVENTOR
Francis A. M. Chapon
BY
ATTORNEYS

UNITED STATES PATENT OFFICE.

FRANCIS AUGUSTE MARIE CHAPON, OF PARIS, FRANCE, ASSIGNOR TO SOCIÉTÉ FRANCIS CHAPON & CIE., OF PARIS, FRANCE.

CASH-REGISTER OR CHECK-TILL.

1,013,741.  Specification of Letters Patent.  Patented Jan. 2, 1912.

Application filed April 22, 1909. Serial No. 491,617.

*To all whom it may concern:*

Be it known that I, FRANCIS AUGUSTE MARIE CHAPON, of 23 Rue Jean Jacques Rousseau, in the city of Paris, Republic of France, manufacturer, have invented an Improved Cash-Register or Check-Till, of which the following is a full, clear, and exact description.

This invention relates to a check-till or cash-registering apparatus, constructed so as to deliver to a customer a ticket bearing the amount of the transaction effected and also all the data necessary to enable this transaction to be verified. Moreover, a band or strip remaining in the interior of the till or apparatus serves as a check by receiving records of all the transactions effected, together with the data peculiar to each of them. This apparatus is characterized more particularly by elements actuated in pairs by means of a handle, in such a manner that two sectors bearing characters can be moved in accordance with the indications of a dial, which characters then print on the ticket and on the checking band or strip when an operating handle or crank is turned. One of the two sectors belongs to a group designed for printing the ticket, while the other sector belongs to a second group serving for printing the checking band or strip.

Figure 1:
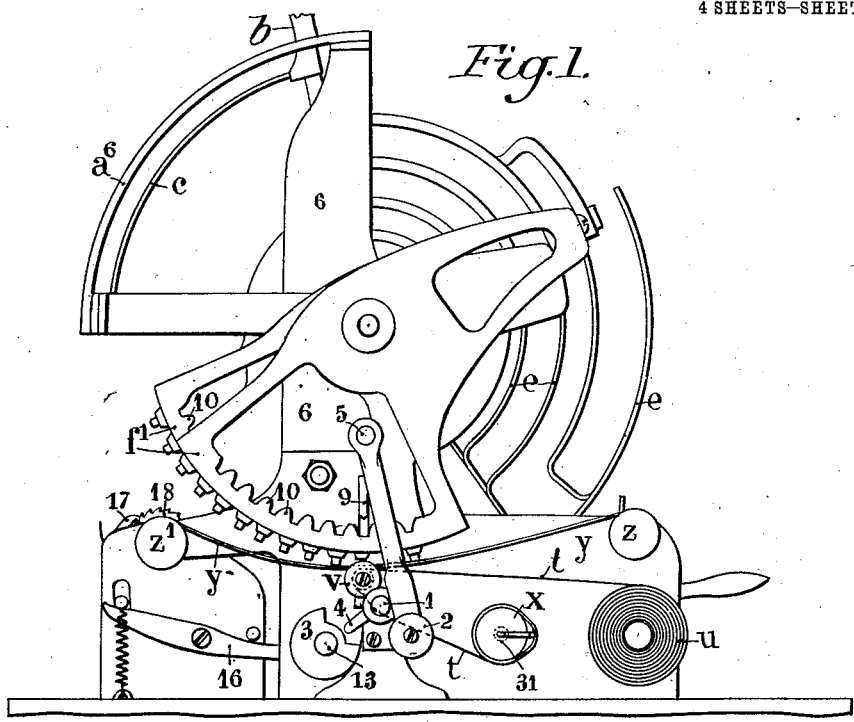
Figure 2:
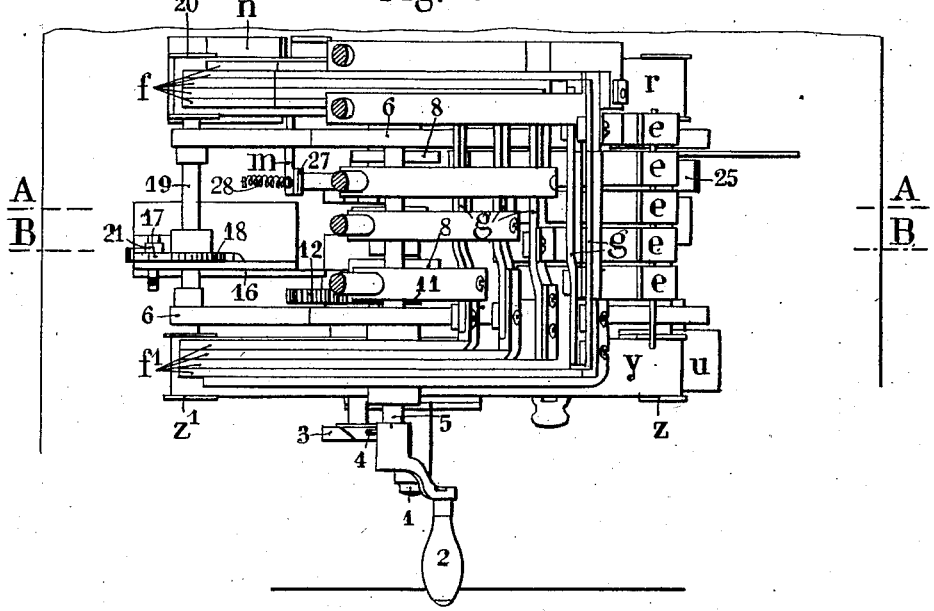

This invention will be hereinafter described with reference to the accompanying drawing, in which:

Figure 1 shows the improved apparatus in elevation looking from the side of the operating handle. Fig. 2 is a plan thereof, partly in section. Fig. 3 shows this apparatus looking from the side of the employee who is to operate it. Fig. 4 is a side elevation looking from the side opposite to the operating handle. Fig. 5 shows the apparatus looking from the customer's side. Fig. 6 is a section on the line A—A, Fig. 2. Fig. 7 is a section on the line B—B, Fig. 2. Fig. 8 is a side view showing one of the elements separately. Fig. 9 is a plan corresponding to Fig. 8. Fig. 10 is a view of the right hand side of Fig. 8. Fig. 11 is a view of the left hand side of Fig. 8.

As will be seen in this drawing, the apparatus comprises, at the employee's side, a number of sectors $a^1$, $a^2$, $a^3$, $a^4$, $a^5$, $a^6$ forming the indicating tablets. The first tablet $a^1$ has letters indicating the employee who makes the transaction; the second tablet $a^2$ indicates tens of francs; the third tablet $a^3$ indicates francs; the fourth tablet $a^4$ indicates tenths; the fifth tablet $a^5$ indicates centimes or hundredths; finally, the sixth tablet $a^6$ indicates the kind of transaction, *e. g.* sale on credit or for cash, etc. A space left free between these different tablets permits the passage of the operating levers $b$ of the elements, each of which actuates with it a small indicating tablet $c$ repeating, in windows $d$ formed through the first tablets, the transaction effected, as regards the francs and centimes only. On the customer's side, the levers $b$ move tablets $e$, in the form of sectors, which indicate the letter of the employee and the amount of the purchase. Moreover, each of the levers $b$ moves a couple of sectors $f$ $f^1$ bearing suitable characters connected by a cross-piece $g$. The sector $f$ forms part of the group printing the ticket and the other sector $f^1$, fixed to the first, forms part of the group printing the checking band or strip.

On the ticket side, the apparatus has a spool $h$ receiving a strong paper band $i$ which passes over a guide $j$; then under a comprising stick or type-holder $g$ indicating the date and number of the order. From this composing stick, the paper band $i$ passes beneath the sectors with characters $f$, then over a cylinder $l$ bearing advertising matter and finally this band comes beneath a cutter $m$ serving to cut off the ticket which leaves the apparatus through the chute $n$. A finger $o$ provided with a spring $p$ and a lifting lever $q$ retains the paper band on the fixed blade of the cutter while the movable blade cuts off the ticket. A band $r$, of fabric, serves for the inking of the composing stick and of the sectors with characters $f$, while a pad $s$ inks the cylinder $l$ bearing the advertisement.

On the side of the checking band $t$, the apparatus has a spool $u$ receiving the said band which, in unrolling, passes under the sectors with characters $f^1$. For this purpose, this band engages with a guide $v$ before being rolled on to a receiving drum $x$. A band $y$ of fabric serves for the inking of the sectors and has its ends rolled on spools $z$, $z^1$. The machine also has on this side a spring stop 1 for the operating handle or crank 2 and a cam 3 controlled by the mechanism for holding this spring stop by means of a tail-piece 4, in order to enable the operating handle or crank to be turned twice for the same transaction.

The handle or crank 2 is keyed on a shaft 5 mounted in the frame 6 with a slight amount of friction. This shaft 5 bears two cams 7 which turn in two frames 8 fixed to a transverse bar 9 serving to fix the printing sectors $f$, $f^1$ in the position which has been given them at the moment of making a transaction. For this purpose, these printing sectors have teeth 10 at their sides nearer the center, between which teeth the transverse bar 9 is capable of descending under the action of the cams 7 which afterward lift this bar again when the transaction is completed. The controlling shaft 5 also carries a pinion 11 which, through a train of gearing 12, drives a second shaft 13 arranged at the lower part of the apparatus. This second shaft 13 is provided, at one end, with the cam 3 for disengaging the spring stop 1, in order to allow the handle 2 to turn. A pinion 14, keyed on this same shaft 13, is provided with a projection 15 which, in turning, abuts against a lever 16 serving to move a pawl 17 acting on a ratchet-wheel 18, fixed to a shaft 19 bearing at its two ends the spools $z^1$ and 20 of the inking ribbons, in order to move these ribbons in accordance with the impressions. The pawl 17 is mounted on a kind of a bolt 21 which in rising allows the drawer of the till to open automatically under the action of a spring when the lock of this drawer has only been closed by one turn. The second shaft 13, toward its middle, also bears a cam 22 for raising the guide 23 for the band of tickets and the guide $v$ for the checking band, in order to effect the printing of these bands by the sectors. The guides 23 and $v$ are mounted on the ends of the shaft 33 and the said shaft and guides are raised by the cam 22 through the medium of the cresent-shaped member 25$^a$ carried by the shaft and having an arm pivoted at 26. The shaft 13 also bears a cam 24, which at the required time raises an arm 25 pivoted at 26 and provided with a link 27 for actuating the movable blade of the cutter $m$. A spring 28 afterward returns this movable blade to the position of rest. One of the frames 8 of the cams 7 is provided with a jointed finger 29 which acts on a ratchet-wheel 30 fixed to the shaft 31 of the drum $x$ receiving the checking band $t$ in order to roll up this band on the said drum in accordance with the transactions completed. A pawl 32 retains the ratchet-wheel 30 in order that the drum $x$ may not run back.

The apparatus thus constructed delivers tickets representing the amount of one transaction, which is capable of varying from 0.05 franc to 79.95 francs.

Let us suppose that the following transaction is to be made:—F—33.30 francs—N. The employee first places all the levers $b$ on the indications corresponding to those given above; this done, he presses back the spring-presser or stop 1 in order to permit the handle 2 to pass. On the first turn of the handle, the transverse bar 9, pushed by the cams 7, secures the printing sectors $f$ and $f^1$; the cam 22 of the lower shaft 13 raises the shaft 33 of the rollers 23 and $v$ guiding the bands $i$ and $t$, in such a manner that the said bands are carried toward the sectors which print the amount of the transaction thereon; at the same time the ticket receives at its lower part the advertisement that the cylinder $l$ serving this purpose, has received. On the second turn of the handle, the cam 24 raises the lever 25 again and the said lever engaging the axis of the roller 34 raises the said roller in order to bring the band of tickets against the composing stick $k$ and to cause the movable blade of the cutter to descend, thus separating the printed ticket from the rest of the band; then this ticket passes out of the apparatus, and so on for any other transactions that may be made. The drum $x$ receiving the checking band rolls up this band when the transverse bar 9 has been lowered again by the cams 7. A cam 35 fixed to the shaft 13 raises the finger $o$ when the band of tickets $i$ receives its forward movement. The forms, details, accessories, materials, and dimensions of this apparatus can obviously be varied without in any way departing from the nature of the invention.

Claims:

1. A check till or cash registering apparatus for simultaneously printing a ticket and a checking band or strip, comprising a plurality of members, each consisting of two sectors having characters on their outer faces and teeth on their inner faces, a bar connecting the sectors and two indicating segments carried by the bar, one for the employee and the other for the customer, a vertically movable transverse bar for engaging the teeth of the sectors to lock them in position, movable guides for forcing the band of tickets and the checking band against the printing surface of the sectors, a cutter for separating the tickets, a shaft provided with an operating handle, and means for operating the said bar, guides and cutter from the shaft.

2. A check till or cash registering apparatus for simultaneously printing a ticket and a checking band or strip, comprising a plurality of members, each consisting of two spaced and connected printing sectors having teeth on their inner faces, and two indicating segments carried by the sectors, one for the employee and the other for the customer, a vertically movable transverse bar for engaging the teeth of the sectors to lock them in position, vertically movable supports for the bands for pressing the bands against the sectors, a cutter for separating the tickets, a shaft provided with a handle, means for operating the locking bar from said shaft, a second shaft geared with the first shaft, and means for operating the supports and cutter from the second shaft.

3. A check till or cash registering apparatus for simultaneously printing a ticket and a checking strip, comprising a plurality of members each consisting of two spaced printing sectors having teeth on their inner faces and two indicating segments carried by the sectors, one for the employee and the other for the customer, a vertically movable bar for engaging the teeth of the sectors to lock them in position, means for pressing the bands against the sectors, a cutter for separating the tickets, a shaft provided with a handle, means for operating the locking bar from the shaft, a second shaft geared with the first shaft, means for operating the cutter and the band pressing means from the second shaft, a spring stop for the handle of said shaft, and a cam on the second shaft for operating the spring stop to permit the handle to be turned.

4. In a check-till or cash registering apparatus for simultaneously printing a ticket and a checking band or strip, two groups of movable printing sectors having teeth on their inner faces, a locking bar for engaging the teeth of the sectors, a winding drum for one of the bands to be printed upon, vertically movable supports for pressing the bands against the printing surfaces, a cutter for severing one of the bands, a shaft provided with a handle, cams on the shaft, frames carrying the locking bar and in which the cams are mounted, means for operating the winding drum from one of the said frames, a second shaft geared with the first shaft, and means for operating the movable supports and cutter from the second shaft.

5. A check-till or cash registering apparatus for simultaneously printing a ticket and a checking band or strip, comprising indicating segments one for the employee and the other for the customer, two groups of printing sectors carrying the indicating segments, a type holder for each group of sectors and in front of the same, inking ribbons for the sectors and type holder, spools on which the inking ribbons are wound, a winding drum for one of the bands to be printed upon, movable supports for the said bands, a cutter, a shaft provided with a handle, cams on the shaft, frames in which the cams are mounted, a locking bar for the sectors carried by the frames, means for operating the winding drum from one of the said frames, a second shaft geared with the first shaft, a printing cylinder on the shaft, an inking device for the cylinder, and means for operating the movable supports, ribbon carrying spools and cutter from the second shaft.

6. A check-till or cash registering apparatus for simultaneously printing a ticket and a checking band or strip, comprising two indicating segments, one for the employee and the other for the customer, two groups of printing surfaces for printing a transaction, the date thereof and an advertisement, inking devices for the said surfaces, movable supports for the bands which are to receive the printing, a winding drum upon which one of the bands is wound, a cutter for severing one of the said bands, a shaft provided with a handle, means for operating the winding drum from the shaft, a second shaft geared with the first shaft, and means for operating the movable supports and the cutter from the second shaft.

7. In a check-till or cash registering apparatus for simultaneously printing a ticket and a checking band or strip, a plurality of spaced and connected printing sectors having teeth on their inner faces, a vertically movable and transverse locking bar for engaging the teeth of the sectors to lock them in position, a shaft provided with a handle, cams on the shaft and frames carrying the said bar and operated by the cams.

8. In a check till or cash registering apparatus for simultaneously printing a ticket and a checking band or strip, groups of printing surfaces, movable guides for pressing the bands into engagement with the printing surfaces, inking ribbons, a cutter for separating the tickets, a shaft provided with an operating handle, a second shaft geared with the first shaft, means for operating the cutter and guides from the second shaft, a spool shaft, spools on the shaft and upon which the inking ribbons are wound, a ratchet wheel on the said shaft, a pawl engaging the ratchet wheel, a till bolt carrying the pawl, and a lever operated by the gear wheel on the second shaft and operating said pawl.

The foregoing specification of my improved cash-register or check-till signed by me this ninth day of April 1910.

FRANCIS AUGUSTE MARIE CHAPON.

Witnesses:
DEAN B. MASON,
R. CHIRIOT.

Copies of this patent may be obtained for five cents each, by addressing the "Commissioner of Patents, Washington, D. C."